United States Patent [19]

Blazenin et al.

[11] 4,018,113
[45] Apr. 19, 1977

[54] APPARATUS FOR ADJUSTING THE CUTTING EDGE OF A TOOL IN A MACHINE TOOL

[75] Inventors: Miroslav Blazenin, Goppingen; Hans-Günter Rohs, Rechberghausen; Bruno Zeller, Weissenstein, all of Germany

[73] Assignee: Gebr. Boehringer G.m.b.H., Germany

[22] Filed: Mar. 1, 1976

[21] Appl. No.: 662,380

[30] Foreign Application Priority Data

Mar. 5, 1975 Germany .......................... 2509586

[52] U.S. Cl. ............................... 82/2 B; 82/34 R; 90/13 C
[51] Int. Cl.² ...................................... B23B 25/06
[58] Field of Search ................. 82/2 B, 34 R, 14 A, 82/14 B, 14 C; 90/13 C

[56] References Cited
UNITED STATES PATENTS

| | | | |
|---|---|---|---|
| 3,181,401 | 5/1965 | Rice et al. | 82/34 R |
| 3,187,247 | 6/1965 | Colten et al. | 90/13 C |
| 3,395,283 | 7/1968 | Sefton et al. | 82/2 B X |
| 3,727,493 | 4/1973 | Lahm | 82/2 B |

Primary Examiner—Leonidas Vlachos
Attorney, Agent, or Firm—Shlesinger, Fitzsimmons & Shlesinger

[57] ABSTRACT

The invention relates to the positional adjustment of a cutting tool in a machine tool for the purpose of ensuring that the cutting tool is exactly in its correct position prior to starting machining operations. The machine tool is of the kind having a cutting tool support displaceable relative to the bed along two axes which are perpendicular to each other. The apparatus provided for the above purpose in accordance with the invention includes an optical projector producing in a stationary plane a picture of the tip of the cutting tool, including its cutting edge. When the tool support is displaced along either axis, the position of the picture on the plane changes accordingly. A stationary linear array of photosensitive diodes is arranged parallel to one of the axes of displacement of the tool support so that individual diodes will be covered or uncovered by the picture when it travels across the plane upon displacement of the tool support. The switching position of individual diodes is thereby altered which results in the emission of impulses whose number corresponds to that of diode covered or uncovered by the moving picture. The impulses are transmitted to an electronic processor whose output signals can be used for controlling the movements of the tool support in response to the arrival of the picture in or its departure from predetermined positions relative to the array of photosensitive diodes and in relation to a fixed reference point.

4 Claims, 10 Drawing Figures

APPARATUS FOR ADJUSTING THE CUTTING EDGE OF A TOOL IN A MACHINE TOOL

BACKGROUND OF THE INVENTION

This invention relates to apparatus for the positional adjustment of a cutting tool in a machine tool of the kind in which the cutting tool is moved into a desired position by displacement along two axes of a system of co-ordinates. The apparatus is of the kind comprising a projector which produces in a position indicator a picture of the cutting tool tip, including its cutting edge. The apparatus described in the foregoing will be referred to in the following as "apparatus of the type described".

In a known apparatus of the kind described (see "Machinery and Production Engineering", 6th January 1971, pages 31 to 36) an upward beam of light is transformed by a perforated rotary disc into a moving beam which sweeps the area within which indications of the cutting tool position relative to the system of co-ordinates are to be obtained. The indicator is so arranged in the machine tool that the cutting tool intercepts the movable beam, the degree of interception depending on the position of the cutting tool in the machine tool. In the case of the interception being nil displacement of the cutting tool is started and continued until its cutting edge begins to intercept the beam, thereby reducing its intensity. In the case of the interception being total, the cutting tool is displaced in the opposite direction. Movement of the cutting tool in one or the other direction continues until the light beam has a preselected intensity. This sequence of operations is carried out first along one of the two axes of the system of co-ordinates and subsequently along its other axis.

The known apparatus had the disadvantage of the intensity of the light beam depending not only on the position of the cutting edge of the cutting tool relative to the axes of the co-ordinate system but also on other factors such as the cleanliness of the optical components of the projector and on the voltage of the electric source of light for the projector. Another disadvantage was the limited accuracy of the measurements of light intensity of the beam.

OBJECTS AND SUMMARY OF THE INVENTION

It is an object of the present invention to provide an apparatus of the kind described which is free from the aforementioned drawbacks.

It is in particular an object of the present invention to provide an apparatus of the kind described in which the accuracy of the positional indication and control of the cutting tool in a machine tool is improved.

It is a further object of the invention to provide an apparatus of the kind described in which mechanically movable elements, such as a perforated rotary disc, are not required.

These objects are achieved by providing in an apparatus of the kind described a linear array of photosensitive diodes arranged in a given position relative to the system of co-ordinates of the machine tool, and a projector with an optical system which is so arranged relative to the cutting tool and the array of photosensitive diodes that the beam of light emitted from the projector and passing through the optical system is intercepted by the cutting tool to a varying degree, depending on the position of the cutting tool in the machine tool, before the beam of light impinges on the array of photo-sensitive diodes. A picture of the cutting tool tip, including its cutting edge, therefore covers a varying number of diodes in that array, the number depending on the position of the cutting tool relative to the axes of the co-ordinate system. An accurate indication of the position of the cutting tool is thus obtained. Any differences of the actual position of the cutting tool relative to a desired position are evaluated in electric control means and utilised for displacing the cutting tool along the two axes of the system of co-ordinates by the amounts required for transferring the cutting tool into the desired position.

BRIEF DESCRIPTION OF THE DRAWINGS

A preferred embodiment of the invention will now be described by way of example with reference to the accompanying drawings, in which.

DETAILED DESCRIPTION OF THE INVENTION

Figure 1:
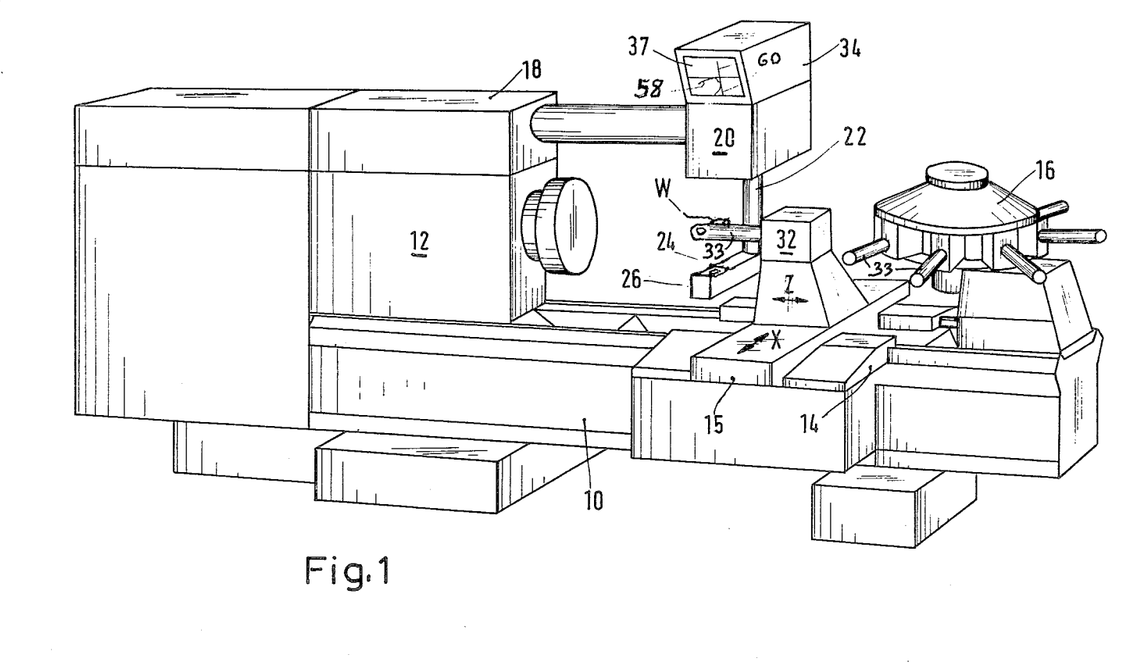
FIG. 1 is a perspective view of a lathe, seen from the operator's side, with a tool support equipped with an apparatus of the invention.
Figure 2:
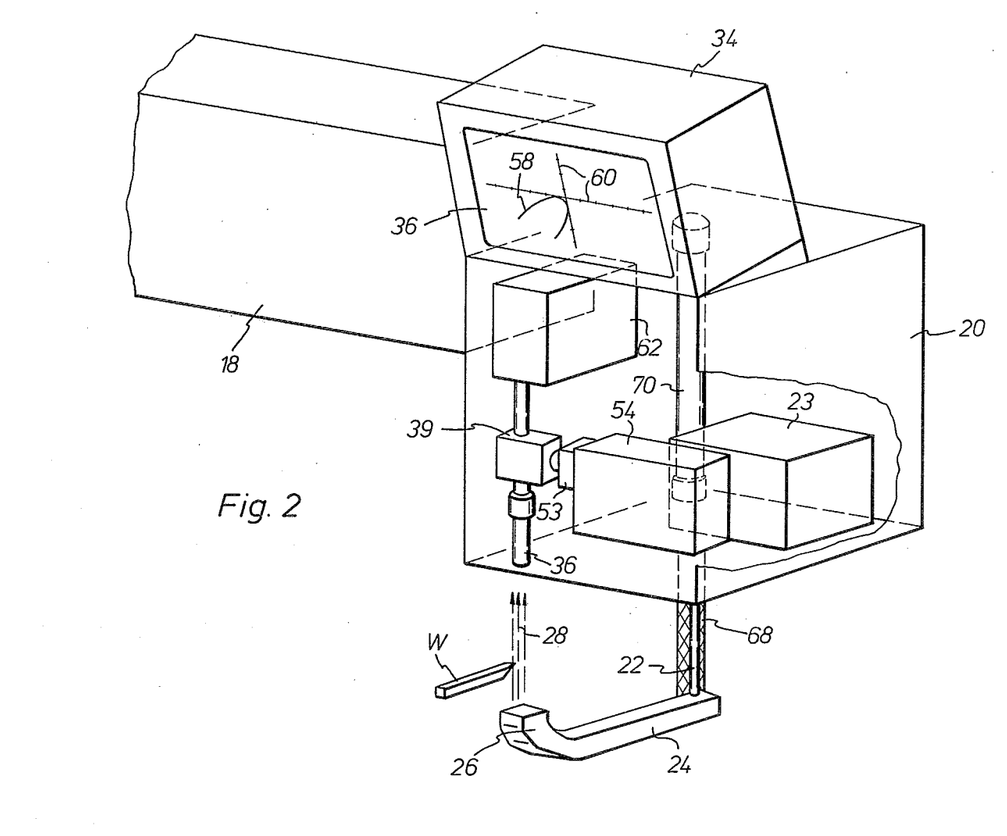
FIG. 2 is a perspective view at an enlarged scale of a casing shown in FIG. 1, the casing being broken away so as to show the arrangement of components of the apparatus of FIG. 1 accommodated therein.

Referring to FIG. 1, a horizontal lathe has a bed 10 carrying a spindle-head 12, with a horizontal main spindle supported therein. The bed 10 is formed with a guideway extending in the longitudinal direction of the lathe and thus parallel to the main spindle axis for the displacement thereon of a saddle or bed-slide 14. A cross-slide 15 is mounted on slide 14 and movable thereon in a direction perpendicular to the main spindle axis. Mounted on the cross-slide 15 is a support 32 in which a tool holder 33 is inserted, a cutting tool W being firmly held in the tool holder 33. In the embodiment shown the tool holder 33 is in form of a rod of circular cross-section which is non-rotatably and non-shiftably fixed in the support 32 and near its free end has a transverse horizontal bore in which the cutting tool W shown in FIG. 2 is so inserted that its end pointing rearwardly with respect to FIG. 1 projects from the tool holder 33 and into a vertical beam 28 of light rays to be referred to hereinafter. In FIG. 2 the tool holder 33 has been omitted whereas the tool W inserted therein has been shown. A magazine 16 which is rotable about a vertical axis stores a plurality of supports 32 carrying tool holders 33, with a cutting tool W inserted in each of them, the supports 32 with their tool holders 33 being selectively taken out of the magazine and placed on the cross-slide 15.

The axis of displacement of the bed-slide 14 is parallel to the longitudinal axis of the lathe and indicated by z in FIG. 1 whilst the axis of displacement of the cross-slide 15 is perpendicular to the longitudinal axis of the lathe and indicated by $x$. The axes $x$ and $z$ form together the system of coordinates, the latter being completed by a vertical axis $y$. The displacement of the slides 14 and 15 along the axes $z$ and $x$ respectively is instrumental in obtaining the desired position of the cutting tool in the machine tool, the movements of these slides being numercially controlled. The bed-slide 14 is movable in both directions of the axis $z$ by a lead screw, not shown, and the cross-slide 15 is movable in both directions of the axis $x$ by a feed screw. Each lead screw is adapted to be driven by a motor and these motors are controlled by the numerical control mechanism (not shown). The design of the lathe so far described can follow conventional lines.

As stated before, it is essential for the cutting edge of a cutting tool W which with its holder 33 is placed in the support 32 ready for a machining operation to be exactly in a predetermined position relative to the two axes of the system of coordinates, in order to achieve the required degree of machining. To this end the position of the cutting tool W in its holder 33 is adjusted in a pre-setting device prior to the holder 33 being placed on the support 32. However, due to a number of reasons such as wear or damage of the cutting edge of the cutting tool or accidental displacements of the cutting tool in its holder, variations from the desired position were still possible.

In order to eliminate any faulty positioning of the cutting tool due to these or other reasons, the lathe shown in FIG. 1 is equipped with the apparatus according to the invention which will now be described in detail.

A horizontal longitudinal beam 18 is rigidly and at the same time adjustable secured to the spindle-head 12, the beam 18 extending as far as slide 14 where it supports a casing 20, the latter being adapted to be placed exactly in a predetermined position in relation to the $x$ and $z$ axes of the lathe. A vertical rod 22 connects casing 20 rigidly and at the same time adjustably to an oblong horizontal hollow holder 24 which terminates towards the operator's side of the lathe in a head 26. Mounted in the head 26 at a distance from the cutting tool W is a collector lens 27 which is illuminated by a source of light from below and emits a vertical beam 28 of light rays in an upward direction, see FIG. 3, the head 26 being situated directly below the tip of tool W as shown in FIG. 2. This lens 27 forms part of a first projector having an optical system whose optical axis is parallel to the axis $y$.

Provided on top of casing 20 is another casing 34 containing a TV monitor 35 with a screen 37, the latter being slightly downwardly inclined as shown in FIGS. 1 and 2.

In order to determine and indicate exactly the position of the cutting edge of tool W, the support 32 with the tool holder 33 inserted therein is moved under numerical control by displacements of the slides 14 and 15 in a position in which the tip of the cutting tool edge will be located at a point of reference whose co-ordinates relative to axes $x$ and $z$ have been fixed in advance. These co-ordinates have been so selected that the tip of the cutting tool is situated close to the vertical axis of the lens 27 when the cutting tool is at the preselected distance from the axes $x$ and $z$. The components housed in casing 20 serve the purpose firstly of detecting any faulty positioning of the cutting tool along the axes $z$ and $z$ with relation to the vertical axis of the lens 27 by making this faulty positioning visible on a screen 37 and secondly of eliminating the faulty positioning by displacements of the tool W by the required amounts along the axes $x$ and $z$. After the faults in the positioning have been eliminated, the tip of the cutting tool will be exactly at the point of reference above referred to and the cutting tool can then be moved under numerical control into any desired position relative to the $x$ and $z$ axes.

Figure 3:
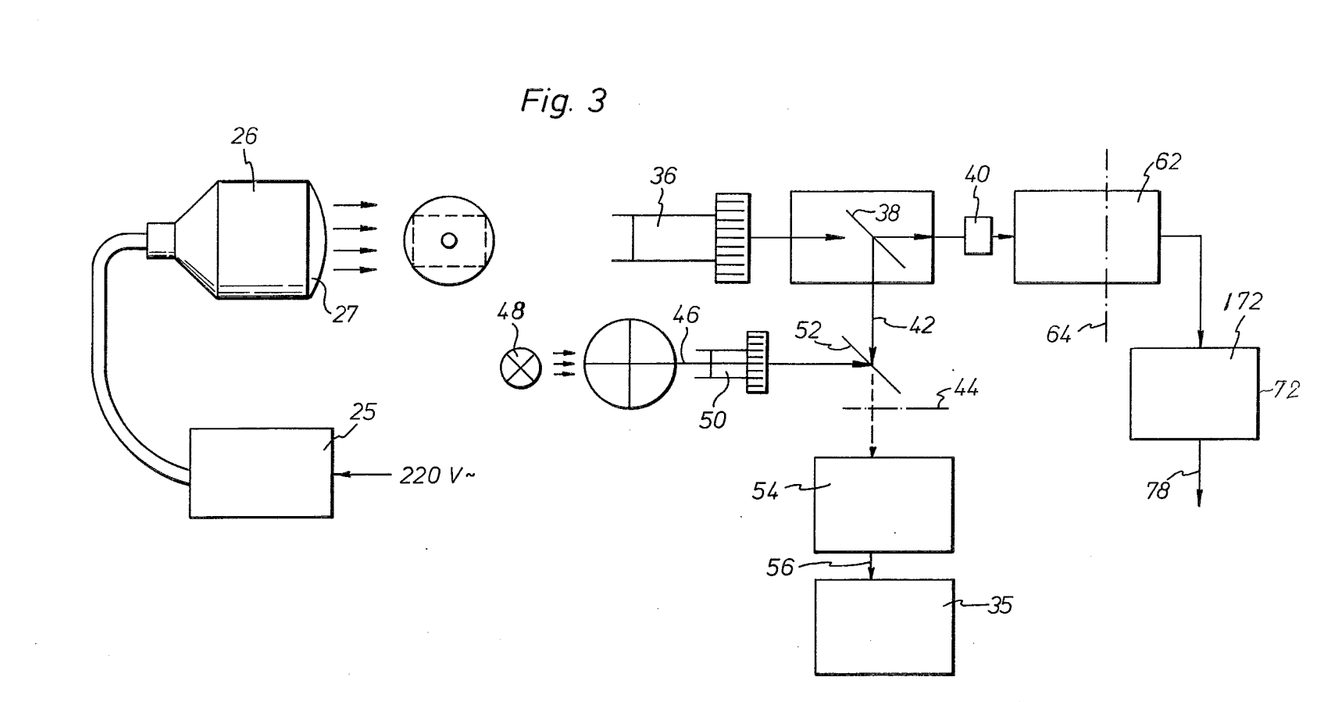
FIG. 3 is a block diagram of the apparatus of FIG. 1, illustrating the manner in which these components co-operate with each other in the positional adjustment of the cutting tool shown in FIG. 1, FIGS. 4 to 7 show a sequence of phases in the positional adjustment of a cutting tool having a curved cutting edge.

The relatively large circle shown in FIG. 3 to the right of head 26 is an indication of the cross-section of the beam 28, the diameter of this circle being e.g. 17 mm. The relatively small circle shown in FIG. 3 inside the large circle and concentric therewith defines the area within which the cutting tool tip will be located in the event of the maximum possible adjustment errors which may occur, the diameter of the relatively small circle being e.g. 254 mm, after the tool tip has been adjusted by the numerical control mechanism to its presumptive starting position. Arranged on the bottom surface of casing 20 and coaxially with respect to lens 27 is an objective lens 36 which forms another part of the first projector; an image divider in the form of a translucent mirror is arranged above lens 36 and at some distance from it. The mirror 38 allows the passage of only a part of the light-rays leaving lens 36 on their way to an optical extension system 40, the latter being coaxial with the collector lens 27 and the objective lens 36, the remainder of the light rays are deflected in the direction of arrow 42 so that the projector comprised of the collector lens 27 and the objective lens 36 produces a real picture of the cutting tool tip in a plane 44 which is parallel to the common axis of the lenses 27 and 36. A second projector is arranged parallel to the plane 44 and has an axis 46. This second projector produces in the plane 44 the picture of two stationary lines, each of which is parallel to a different one of the axes $x$ and $z$, the lines being formed by cross-wires 48. To this end the second projector is provided with an objective lens 50 and a translucent mirror 52 arranged behind the lens 50 and serving the purpose of superposing the cross-wires 48 onto the picture of the cutting edge tip in plane 44. The picture resulting from this superposition is photographed by a TV camera 54 connected by a cable 56 to monitor 35. The screen 37 of monitor 35 shows therefore the cutting tool edge 58 in FIG. 2 with the crosswires being shown at 60. The crossing lines 60 formed by the picture of the cross wires represent a stationary coordinate system on which the relative position of the cutting edge 58 is visible.

The optical extension system 40 produces a second picture of the tool cutting edge inside a casing 62. This second picture which e.g. is situated in a plane 64, FIG. 3, is reproduced in FIGS. 4 to 9. Arranged in the plane 64 inside casing 62 is a linear array 66 of photosensitive diodes, such an array being known in itself. It is for instance available from Reticon Corporation, of 365 Middlefield Road, Mountain View, California 94040, U.S.A., under the name of "Solid State Line Scan Camera". The array 66 forms here part of an integrated circuit and consists of a great number of photosensitive diodes, all arranged along a straight line which is parallel to the axis Z. The number of photosensitive diodes in an array may be e.g. 256.

The arrangement in space of the components of the apparatus of the invention which are diagrammatically shown in FIG. 3 is illustrated in FIG. 2. The objective lens 36 of the first projector is inserted in an opening provided in the bottom of the casing 20. This casing encloses a casing 39 which contains the mirror 38 and is arranged above objective lens 36 and the casing 62 with the array 66 is arranged above casing 39. The optical extension system 40 may be mounted on the bottom wall of casing 62. Arranged laterally of casing 39 is a casing 53 which contains the mirror 52, and arranged laterally of casing 53 is the TV camera 54 whose cable 56 is not shown in FIG. 2.

Arranged at the rear of casing 54 is a casing 23 which contains a source of light 25 for the first projector. A light-carrying conductor 68 made of glass fibres passes from the head 26 through the holder 24 and from there into casing 23. The light carried by conductor 68 impinges from below onto collector lens 27.

The means for moving rod 22 up and down include a cylinder 70 secured to a casing 20 and a piston (not shown) connected to the rod 22.

Figure 6:
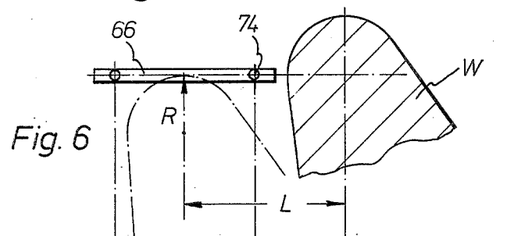
Figure 7:
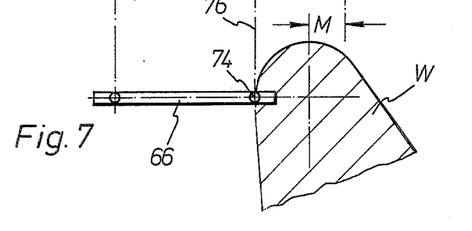
Figure 8:
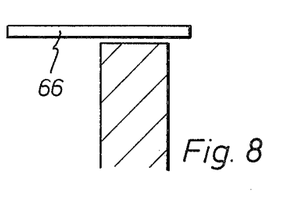
FIGS. 8 and 9 show phases corresponding to those of FIGS. 4 and 5 respectively in the positional adjustment of a cutting tool having a straight cutting edge.
Figure 9:
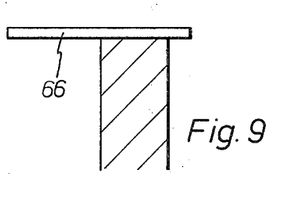

The cutting edge of the cutting tool W shown in FIGS. 4 to 7 is of a circularly curved shape. A cutting tool of different shape is illustrated in FIGS. 8 and 9, this cutting tool being the cutting blade of a lathe having a cutting edge formed by two parallel flanks and by an edge at the tip which is perpendicular to these flanks.

Figure 4:
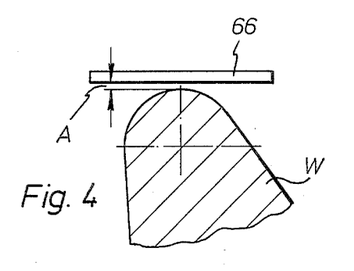
Figure 5:
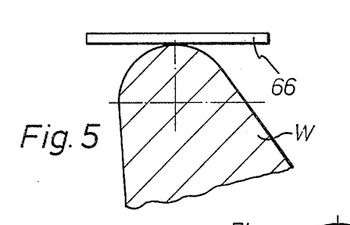

The manner in which the afore-described apparatus is operated for the positional adjustment of a cutting tool in a machine tool will now be described:

After a tool W which is suitable for the particular machining operation to be carried out has been selected from the magazine 16 and placed together with its holder 33 and the support 32 on the cross slide 15, the tool is moved into the reference position by displacements of the slides 14 and 15 along the axes z and x respectively, the co-ordinates of the reference position having been fixed in advance. When the tool W is in this position, the picture of its tip touches with its cutting edge the array 66 in one point only as shown in FIG. 5, or in other words, the line along which the diodes of the array are arranged is tangential to the cutting edge. However, assuming that the positioning of the tool W is not as accurate as desired, the picture of the tool cutting edge will be displaced relative to that shown in FIG. 5 and may be in the position illustrated in FIG. 4. This Figure shows a gap A existing between the picture and the array 66. In this case an electronic processing unit 172 takes over (FIG. 3) which is accommodated in a casing 72 and connected to the diodes of the array so as to detect the respective switching condition of each individual diode, this condition depending, as known, on a diode being illuminated or in the shadow. The switching condition of the diodes is continuously monitored by the unit 172, as is known, with the use of VHF electric current. If the unit 172 finds then that none of the diodes in the array 66 is in the shadow, displacement of the cross-slide 15 along the x axis is started. This results in the picture of the tip of tool W moving from the position of FIG. 4 to that of FIG. 5 in which latter the picture touches the array 66 as stated before. The distance traversed by the picture when moving from the position of FIG. 4 into that of FIG. 5 is then equal to A and this is also representative of the distance traversed by the cross-slide 15. Further movement of the picture in the same direction results in the picture covering certain diodes of the array 66 whereby an impulse signal from the unit 172 is released and further movement of the cross-slide 15 along the axis x is stopped.

After the picture has reached the tangential position of FIG. 5, advance of the slide 14 along the z axis by an amount L (FIG. 6), e.g. towards the right, is started by the numerically controller, the amount L being substantially equal to or somewhat in excess of the sum of the length of the array 66 and the radius R of the circular cutting edge, this radius being, of course, known in advance and having been taken into account in the programming of the adjustment operation. This phase is followed by another one in which feed motion of the cross-slide 15 causes displacement of the picture along the x axis by the distance R. In this manner, the picture of the cutting tool tip is moved relative to the array 66 into the transitional position of FIG. 6 wherein the picture is at the right of the array spaced therefrom and the centre of the circular cutting edge is situated on the longitudinal axis of that array. When the position of FIG. 6 has been reached by the tool picture displacement along the z is restarted, this time towards the left in FIG. 6. At a certain point during this movement, i.e. when a diode situated at a selected point 74 has been reached and overlapped by the picture, the unit 172 emits again an impulse signal which arrests the advance of the tool along the z axis, the picture being then in the position of FIG. 7; the amount of displacement of the picture during this phase is indicated in FIG. 7 as being equal to M. Starting from the position in FIG. 4, the total displacement of the tool W along the z axis is therefore equal to L − M and its displacement along the x axis is equal to A + R. Provided the presumptive starting position of the cutting edge as shown in FIG. 4 differs in the direction of the vertical axis y from the exact position by not more than 0.1 mm the position of a picture shown in FIG. 7 can be regarded as being fixed in a definite manner relative to bed 10 of the lathe by the position of the beam 18 after its adjustment, by the position of the array 66 and of the point 74 in the array and by the length of the radius R, i.e. the contour of the cutting tool edge. The position of FIG. 7 is then the starting position from which the tool W can be moved with great accuracy into any other position by numerical control.

The movements of the cross-slide 15 are thus so controlled by the unit 172 that the picture of the tool cutting edge first arrives in a tangential relationship in which it touches or just covers the array 66 as shown in FIG. 5 and that thereupon the picture is moved by displacing the slides 14 and 15 along the axes z and x respectively, to the overlapping relationship of FIG. 7 showing the picture in a position in which the left-hand flank of the tool tip has travelled to a tangential position relative to a straight line 76 which perpendicularly intersects the array 66 at point 74.

Figure 10:
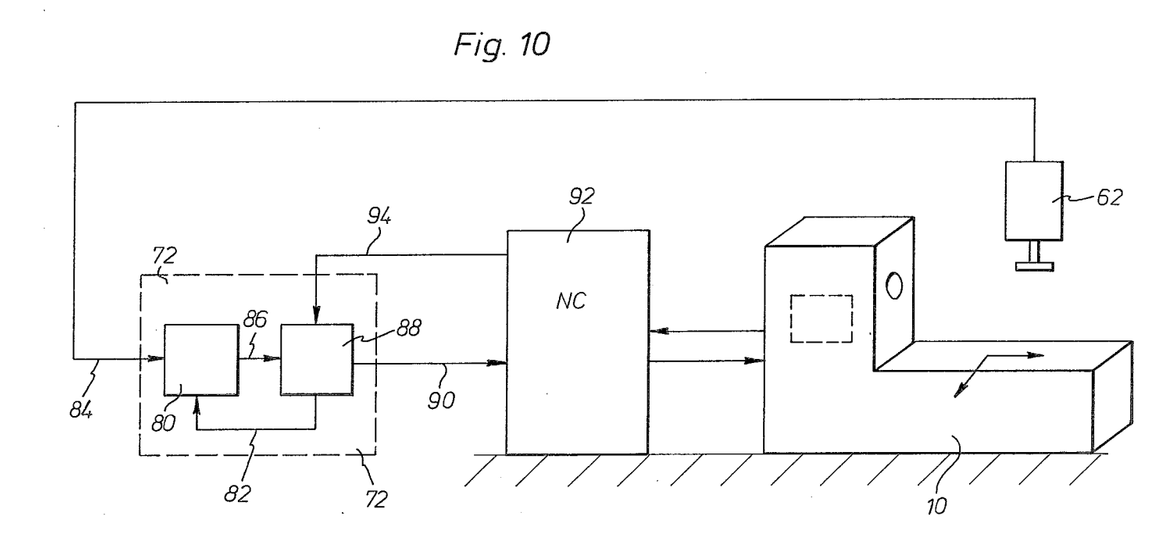
FIG. 10 is a block diagram of an electronic processing unit forming part of the apparatus according to the invention.

The unit 172 is diagrammatically shown in detail in the block diagram of FIG. 10. The unit includes a counter 80 whose input line 84 is connected to the equipment in casing 62 and receives through that line as many impulses as there are illuminated diodes in the array 66. The counter readings are transmitted by an output line 86 to a comparator 88 which compares the readings with a preset reference value, the latter being determined by a numerically operated controller 92 connected by lines 90 and 94 to the comparator 88. The controller 92 decides also whether the counter is to count the number of illuminated or of covered diodes in the array 66, the relevant signals being transmitted to the comparator by the same line 84. The comparator 88 controls the counter 80 via a line 82.

As soon as a reading in the counter 80 exceeds a preset low figure — e.g. 5 (which means that the tool picture has arrived in its substantially tangential relationship shown diagrammatically in FIG. 5 and more realistically by a broken line in FIG. 6 the number of diodes covered by picture of the tool tip exceeds the limit 5) — the comparator 88 transmits a signal via output line 90 to the controller 92, causing the latter to displace the bed-slide 14 along the z axis causing the tool picture to travel the distance L. After this latter displacement has been carried out, the controller 92 causes by motion of cross-slide 15 to advance the picture in the same direction as before by the distance R so that the picture takes up the full-line transitional position in FIG. 6. The movements which transfer the picture in FIG. 6 from the chain-line position to the full-line position may also be carried out simultaneously instead of successively. The controller 92 causes thereupon the bed-slide 14 to be displaced along the z axis but in a direction opposite to the prior displacement in that axis whereby the picture is caused to travel from the full-line transitional position in FIG. 6 to the left. At the same time, the controller 92 changes the signal transmitted via line 94 and sets comparator 88 to that number of covered diodes which are to the right of point 74. As soon as the picture has reached point 74 in overlapping relation to the diode located at this point thus covering the set number of diodes, comparator 88 registers the identity of the set figure with the number recorded in the counter 80 and emits a signal via output line 90 to controller 92 which on receiving that signal stops the displacement of tool W. The latter is now in the position for starting up programmed machining operations, with the required displacements of the tool W being controlled by the controller 92.

By proceeding in the manner described, a high degree of accuracy in the adjustment of the tool position is obtained. It should also be noted in this context that the apparatus described in the foregoing does not include any mechanically moved parts.

Displacement of the slides 14 and 15 in the z and x axes can also be manually effected. In this case the operator has to take his instructions from the positions of the picture on the screen 36 and from signals in an output line 78 of the unit 172, emitted by the unit 172 when the positions of FIGS. 5 and 7 are reached by the picture. One or more signal transmitters may be connected to this end to the unit 172.

Should the tool W take up at the start of operations, i.e. in the first phase, a position in which the picture covers the array 66 entirely, the unit 172 reacts to this condition by displacing the tool along the x axis in a direction opposite to that of the displacement of the tool described with reference to FIG. 4. The tool displacement in that opposite direction is stopped by a signal emitted at the moment at which the array 66 is no longer covered by the picture the latter having arrived in its substantially tangential relationship to the array.

So far it has been assumed that the tool W comes to a standstill when the picture reaches the photodiode at point 74. Alternatively the arrival of the picture at point 74 is merely registered in the controller 92 and the tool W continues its displacement. As a further alternative it is possible to let the displacement of the tool W continue after the picture has reached the tangential relationship, so as to move the picture without a break into the full-line overlapping relationship of FIG. 6. Here again the arrival of the picture at the chain-line tangential relationship has to be recorded in the controller 92.

The embodiment of the invention described in the foregoing is capable of a variety of alterations.

The apparatus of the invention is applicable to the positioning of cutting tools of different contour. Instead of being contoured as shown in FIGS. 4 to 7, the cutting tool may, for instance, be contoured as shown in FIGS. 8 and 9, FIG. 8 showing the picture in the first phase position corresponding to FIG. 4 and FIG. 9 in the second phase position corresponding to FIG. 5.

We claim:

1. In a machine tool of the type including a bed, a tool support, means for mounting said tool support on said bed for relative movement in a first direction and in a second direction at right angles to said first direction, feeding means for feeding said tool support in said directions, and control means for controlling said feeding means, the combination comprising a projector mounted on said bed at a distance from the tip of a tool mounted on said tool support and including optical means for producing a picture of a cutting edge of said tool tip within a plane, the axis of said optical means extending at right angles to said feeding directions, said picture travelling in a first travel direction within said plane, when said support is fed in said first direction, and travelling in a second travel direction, when said support is fed in said second direction, a single electronic integrated circuit element forming a linear photodiode array mounted in stationary relationship to said bed within said plane and extending parallel to said second travel direction and in the path described by said picture when travelling in said first travel direction, detecting means connected with said photodiodes and responsive to arrival of said picture substantially in tangential relationship to said array, electrical means connected with said detecting means and with said control means and being operative in response to said arrival to start a feed of said support which causes said picture to travel into a transitional position located on the longitudinal axis of said array and spaced from said array and, thereafter, to travel in said second direction towards said array and into an overlapping relationship to a predetermined photodiode of said array, and registering means connected with said array and with said electrical means to register the positions of said support, when said picture arrives in said tangential relationship and in said predetermined overlapping relationship.

2. In a machine tool of the type including a bed, a tool support for supporting a cutting tool having a tip provided with a cutting edge, means for mounting said tool support on said bed for relative feed movement in a first direction and in a second direction at right angles to said first direction, feeding means connected with said tool support for feeding same in said directions, and control means for controlling said feeding means, the combination comprising a stationary projector mounted on said bed at a distance from said tip of the tool and including optical means for producing a picture of said tip within a plane, the axis of said optical means extending at right angles to said directions, said picture travelling in a first travel direction within said plane, when said support is fed in said first direction, and travelling in a second travel direction at right angles to said first travel direction, when said support is fed in said second direction, a single electronic integrated circuit element forming a linear photodiode array mounted in stationary relationship to said bed within said plane and extending parallel to said second travel direction, and monitoring means for so operating said control means as to cause said picture of said tip to first travel in said first travel direction into a substantially tangential relationship to said array and to thereafter travel in both travel directions into a predetermined transitional position spaced from said array and thence in said second travel direction to an overlapping relationship to said array, said picture in said overlapping relationship being tangential to a straight line intersecting said array at right angles at a predetermined intersection point.

3. The combination claimed in claim 1 in which said electrical means include counting means connected with the photodiodes in said array counting the number of diodes overlapped by said picture and comparator means being connected with said counting means and with said control means and being responsive to the count reaching a predetermined number for controlling the registering means.

4. The combination claimed in claim 2 in which said monitoring include counting includecounting means connected with the photodiodes in said array counting the number of diodes overlapped by said picture and comparator means being connected with said counting means and with said control means and being responsive to the count reaching a predetermined number for halting the travel of said picture.

* * * * *